US012513477B2

(12) United States Patent
Badiger et al.

(10) Patent No.: US 12,513,477 B2
(45) Date of Patent: Dec. 30, 2025

(54) HEARING DEVICE

(71) Applicant: Sivantos Pte. Ltd., Singapore (SG)

(72) Inventors: Ravikumar Badiger, Singapore (SG); Yik Bin Lee, Singapore (SG); Elson Lim, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 257 days.

(21) Appl. No.: 18/354,793

(22) Filed: Jul. 19, 2023

(65) Prior Publication Data

US 2024/0031749 A1 Jan. 25, 2024

(30) Foreign Application Priority Data

Jul. 19, 2022 (DE) .................... 10 2022 207 352.5

(51) Int. Cl.
*H04R 25/00* (2006.01)

(52) U.S. Cl.
CPC .......... *H04R 25/65* (2013.01); *H04R 25/602* (2013.01); *H04R 2225/021* (2013.01); *H04R 2460/11* (2013.01)

(58) Field of Classification Search
CPC .. H04R 25/65; H04R 25/602; H04R 225/021; H04R 2460/11
See application file for complete search history.

(56) References Cited

U.S. PATENT DOCUMENTS

| | | | | |
|---|---|---|---|---|
| 2,493,734 A * | 1/1950 | Pearson | H04R 11/06 381/328 |
| 4,870,688 A | 9/1989 | Voroba et al. | |
| 7,123,733 B1 | 10/2006 | Borowsky et al. | |
| 8,103,032 B2 | 1/2012 | Ho et al. | |
| 2016/0269837 A1 | 9/2016 | Kuhn | |

FOREIGN PATENT DOCUMENTS

| | | |
|---|---|---|
| DE | 102007047335 A1 | 4/2009 |
| DE | 102012214489 A1 | 6/2013 |
| EP | 3068145 A1 | 9/2016 |
| JP | H09215098 A | 8/1997 |
| WO | 9103139 A1 | 3/1991 |

OTHER PUBLICATIONS

Flitney, Robert K. Seals and Sealing Handbook (6th Edition). Oxford: Elsevier, 2014. Web.

* cited by examiner

*Primary Examiner* — Sunita Joshi
(74) *Attorney, Agent, or Firm* — Laurence A. Greenberg; Werner H. Stemer; Ralph E. Locher

(57) ABSTRACT

A hearing device, especially a hearing aid device, has a support frame which is enclosed by a housing. The housing has an upper housing shell and a lower housing shell, which are joined together at a circumferential edge and overlap to form a labyrinth seal. The support frame has an outwardly directed protrusion, which engages with the labyrinth seal.

9 Claims, 4 Drawing Sheets

HEARING DEVICE

CROSS-REFERENCE TO RELATED APPLICATION

This application claims the priority, under 35 U.S.C. § 119, of German Patent Application DE 10 2022 207 352.5, filed Jul. 19, 2022; the prior application is herewith incorporated by reference in its entirety.

FIELD AND BACKGROUND OF THE INVENTION

The invention relates to a hearing device, having a support frame, which is enclosed by a housing, containing an upper housing shell and a lower housing shell. The hearing device is preferably a hearing aid device.

Persons who suffer from a diminished hearing capacity usually make use of a hearing aid device, which is a hearing device. In this case, ambient sound is converted usually by means of a microphone, i.e., an electromechanical sound transducer, into an electrical (audio/sonic) signal, so that the electrical signal is detected. The detected electrical signals are processed by an amplifier circuit and conducted by means of a further electromechanical transducer in the form of an earpiece into the auditory canal of the person. Moreover, there is usually processing of the detected sonic signals, for which a signal processor of the amplifier circuit is generally used. The amplification is attuned to the particular hearing loss of the wearer of the hearing device. The (sonic) transducers and the amplifier circuit are usually arranged in a housing and are thereby protected at least in part from environmental influences.

For example, the housing is relatively robust in configuration, and the individual components are secured to the inner walls of the housing and thus stabilized. However, a replacement of the housing is usually done in order to adapt it to the particular person, for example slight changes of the anatomy of the person and/or different skin colors. Thus, it is required to dismantle the individual components and install them in the new housing.

Therefore, so-called support frames are usually employed, on which the individual components are fastened and by means of which the mechanical integrity of the hearing aid device is realized. The support frame itself is enclosed by a relatively thin-walled housing. The housing usually contains two housing shells. For the assembly process, the support frame is inserted into one of the housing shells, and the remaining housing shell is placed thereon, so that the two housing shells lie against each other to form a circumferential edge.

In this case, in order to be adapted to the person, it is only necessary to replace the housing, whereas all other parts remain available as a module on account of the support frame. This module can be inserted into the new housing in unchanged form. In this way, the adaptation to the individual persons becomes easier. Furthermore, the adaptation can also be done locally in this way by the dealership, without having to keep a stock of many different complete hearing aid devices on hand. Instead, only corresponding housings are required.

During the use of the hearing aid device, it is exposed to environmental factors and also the sweat of the wearer, which can get in for example through openings of the housing or between the housing halves and may result in damaging of the components arranged therein. As a remedy for this, it is known to glue the edge, i.e., to cohesively join the two housing shells to each other. But then a subsequent replacement is no longer possible. There are also high demands on the glue joint in order to make sure that no moisture can get in. In an alternative embodiment, a rubber seal is present for example between the two housing halves. But this increases the design space of the hearing aid device, so that it becomes relatively noticeable. In one modification, a labyrinth seal is present between the two housing shells. But due to the relatively thin-walled housing shells, the extent of the labyrinth seal formed between them is limited, so that a tightness cannot always be achieved.

SUMMARY OF THE INVENTION

The invention addresses the problem of indicating an especially suitable hearing device, one which increases the fault safety and/or reduces the design space in particular, while advisedly reducing the manufacturing costs.

According to the invention, this problem is solved by the features of the independent claim. Advantageous modifications and configurations are the subject of the dependent claims.

With the foregoing and other objects in view there is provided, in accordance with the invention, a hearing device. The hearing device has a housing with an upper housing shell and a lower housing shell. The upper and lower housing shells are joined together at a circumferential edge and overlap to form a labyrinth seal. A support frame is enclosed by the housing, the support frame has an outwardly directed protrusion which engages with the labyrinth seal.

For example, the hearing device is an earphone or it contains an earphone, and the hearing device is a headset, for example. Especially preferably, however, the hearing device is a hearing aid device. The hearing aid device serves for assisting a person suffering from a diminished hearing capacity. In other words, the hearing aid device is a medical device, by means of which a partial hearing loss can be compensated, for example. The hearing aid device is, for example, a "receiver-in-the-canal" hearing aid device (RIC; ex-earpiece hearing aid device), an in-the-ear hearing aid device, such as an "in-the-ear" hearing aid device, an "in-the-canal" hearing aid device (ITC) or a "complete-in-canal" hearing aid device (CIC), hearing spectacles, a pocket hearing aid device or a bone conduction hearing aid device. Preferably, the hearing aid device is a "behind-the-ear" hearing aid device, which is worn behind the outer ear.

The hearing device is configured and adapted to be worn on the human body. In other words, the hearing device preferably contains a holding device, by means of which a fastening on the human body is possible. For example, the holding device is formed by means of a shape or outer contour of the hearing device. Insofar as the hearing device involves a hearing aid device, the hearing device will be configured and adapted to be arranged, for example, behind the ear or within the auditory canal. In particular, the hearing device is wireless and is designed and adapted to be introduced at least partly into the auditory canal.

The hearing device contains for example a microphone, serving for the detecting of sound. In particular, during use, an ambient sound or at least a portion thereof is detected by means of the microphone. The microphone is in particular an electromechanical sound transducer. The microphone contains for example only a single microphone unit or multiple microphone units which interact with each other. Each of the microphone units advisedly contain a membrane, which is caused to oscillate by virtue of sound waves, and the oscillations are converted into an electrical signal by means of a corresponding receiving device, such as a magnet moving in a coil. Thus, it is possible to detect an audio signal by means of the respective microphone unit, which audio signal is based on the sound impinging on the microphone unit. The microphone units are omnidirectional in design, in particular.

Advisedly, the hearing device contains an earpiece for putting out an output signal. The output signal here is an electrical signal in particular. The earpiece is advisedly an electromechanical sound transducer, preferably a loudspeaker. Depending on the design of the hearing device, in the normal state the earpiece is at least partly situated inside the auditory canal of the wearer of the hearing device, i.e., a person, or it is at least acoustically connected thereto. The hearing device serves in particular principally for putting out the output signal by means of the earpiece, whereupon a corresponding sound is produced. In other words, the principal function of the hearing device is preferably the putting out of the output signal. The output signal is produced here in particular at least partly dependent on the sound detected by means of the microphone.

The hearing device advisedly contains a signal processor, which suitably forms a signal processing unit or is at least part of one such unit, however. The hearing device advisedly contains at least a corresponding signal processing unit. The signal processor is for example a digital signal processor (DSP) or it is realized by means of analog components. By means of the signal processor, in particular, an adapting of the (audio) signal produced by means of the given microphone is done, preferably in dependence on the given hearing loss of the wearer of the hearing device. Advisedly, an A/D converter is arranged between the microphone and the signal processing unit, such as the signal processor, in the event that the signal processor is designed as a digital signal processor. The signal processor is adjusted in particular in dependence on a parameter set. By means of the parameter set, an amplification in different frequency ranges is dictated, so that the signal produced by means of the microphone is processed according to certain rules, especially in dependence on the hearing loss of the wearer of the hearing device. Especially preferably, the hearing device additionally contains an amplifier, or the amplifier is formed at least partly by means of the signal processor. For example, the amplifier is hooked up before or after the signal processor in terms of signaling.

The hearing device comprises a support frame, also known as a carrier, an electronics frame, or a "frame". By means of the support frame, further parts/components of the hearing device are stabilized, especially electronics components. Preferably, the given microphone, the signal processor, the signal processing unit and/or the given A/D-converter are held on the support frame, and these are preferably mounted on the support frame. In particular, the support frame forms the mechanical stabilization of a module of the hearing device, and all or at least most of the functionalities of the hearing device are provided in particular by means of the module. Preferably, the support frame is made of a plastic.

Furthermore, the hearing device contains a housing, by means of which in particular the outer shell of the hearing device is formed at least for a portion. The housing is preferably made from a plastic, and a thickness of the housing is advisedly relatively slight. For example, the thickness of the housing is between 0.5 mm and 3 mm. The support frame is enclosed by means of the housing, so that the support frame in the assembled state is not visible in particular. The shape and/or color of the housing is advisedly matched to the particular user of the hearing device, i.e., the particular person/wearer.

The housing comprises an upper housing shell and a lower housing shell, i.e., two housing shells. In particular, the housing is formed by means of the two housing shells. The upper housing shell advisedly forms the top closure of the hearing device in the vertical direction when the hearing device is being worn properly by the person. It is possible for a portion of the lower housing shell to also form the top closure of the housing in the vertical direction, but this surface of the boundary is smaller in comparison to the surface formed by means of the upper housing shell. The lower housing shell, in turn, preferably forms a larger surface for the downward boundary of the housing in the vertical direction, as compared to the upper housing shell.

Preferably, however, the upper boundary of the housing in the vertical direction will be formed entirely by means of the upper housing shell and the lower boundary of the housing in the vertical direction will be formed entirely by means of the lower housing shell. Moreover, it is possible for the upper housing shell and the lower housing shell to also form additional side boundaries of the hearing device, especially if the housing has a curved configuration.

The two housing shells are put together to form a circumferential edge. The edge determines the transition between the two housing shells, especially on the outer side of the housing. The two housing shells overlap to form a labyrinth seal. In other words, the labyrinth seal is advisedly formed in the area of the edge, and the two housing shells preferably engage with each other. The housing shells are preferably configured to be flush with each other on the outer side. This prevents a depositing of foreign particles here. The risk of injury to the wearer is therefore also ruled out here. For example, the overlap and thus also the labyrinth seal runs along the entire edge. Alternatively, the housing shells only overlap along a portion of the edge, and along the remaining portion they butt against each other, for example, especially if no other part or only a relatively robust/durable further part of the hearing device is situated in this area.

Thus, thanks to the labyrinth seal, a surface along which the two housing shells lie against each other is enlarged, so that the creepage distance for moisture/liquid penetrating between them is increased. In summary, because of the labyrinth seal the two housing shells lie against each other with an enlarged surface and partly engage with each other, for example. Advisedly for this, the cross section of the two housing halves is L-shaped in the region of the overlap.

The support frame has an outwardly oriented protrusion, which engages with the labyrinth seal. In other words, the protrusion points in the direction toward the housing halves. In particular, the protrusion is elongated and runs preferably parallel to the edge. In other words, the protrusion runs along the support frame. For example, the protrusion is encircling, so that it advisedly runs along the entire edge. Alternatively, the protrusion is recessed, so that it has an interrupted configuration and has regions which are separate from each other.

In summary, therefore, the labyrinth seal has a region in which the two housing shells lie against each other. Moreover, a region is present in which one housing shell lies against the protrusion. A further region is also present, in which the other housing shell lies against the protrusion. Thus, the entire surface in which two structural parts bear against each other in the region of the edge is enlarged, so that the creepage distance is increased. It is therefore possible to select a relatively slight thickness for the housing shells, and thus also a small size for the labyrinth seal, with a comparatively large creepage distance nevertheless being provided. Thus, on account of the protrusion, the penetration of moisture/liquid is further reduced, so that the fault safety is increased. Since the thickness of the housing shell can be reduced, the design space is also smaller. Furthermore, no additional parts are needed to ensure the tightness, so that on the one hand material costs and on the other hand the necessary assembly steps are reduced. Therefore, manufacturing costs are reduced.

Advisedly, one of the housing shells or both of the housing shells are fastened on the support frame, preferably in removable manner. In particular, at least one of the housing shells is clipped onto the support frame. Thus, the stability is increased. Especially preferably, the labyrinth seal is encircling, so that the housing shells always overlap in the area of the edge. The protrusion preferably has an interrupted configuration and is present, for example, only at positions of other, relatively sensitive components. In this way, the assembly process is easier. Moreover, it is not necessary to maintain a corresponding encircling recess for the protrusion in the housing shells in the area of the labyrinth seal, so that the robustness of the housing shells is not excessively decreased. Advisedly, the housing shells have an increased thickness in the region where the protrusion is not present, and the labyrinth seal is accordingly widened.

Due to the engaging of the protrusion with the labyrinth seal, a first gap is formed between the protrusion and the lower housing shell and a second gap between the protrusion and the upper housing shell. These are present, in particular, so that the two housing shells can be joined together despite the existing manufacturing tolerances. For example, the thickness of the two gaps is equal to each other. Especially preferably, however, the thickness of the first gap is increased. If moisture/liquid gets in through the labyrinth seal to the protrusion, i.e., between the two housing shells in the region of the overlap, it will thus be taken into the first gap and thus to the lower housing shell. This will also be favored by the force of gravity, since the lower housing shell and consequently also the first gap is situated below the second gap in the normal state in the vertical direction. Thus, moisture/liquid, if it gets through the labyrinth seal, will be drained into the lower part, and the moisture/liquid will not get into the upper part of the housing, from which it would flow on account of the force of gravity into the lower part of the housing. Moisture/liquid will get into the second gap only by virtue of capillary forces, but this is negligible in normal usage.

Consequently, the size of the surface inside the housing that comes into contact with the moisture/liquid, if any should penetrate inside it, is decreased. Especially preferably, an electronics, such as a signal processor, of the hearing device is arranged in an upper part of the support frame, in the vertical direction, preferably in the vertical direction on top of the second gap. But at least the electronics or other sensitive components of the hearing device are associated with the upper housing shell in the assembled state and in particular enclosed by means of it. Thus, thanks to the configuration of the gaps, the moisture/liquid is kept away from them.

Preferably, a first bearing surface is formed between the protrusion and the lower housing shell and a second bearing surface between the protrusion and the upper housing shell. In particular, the first bearing surface has a thickness which is determined by means of the first gap. The second bearing surface has a thickness which is equal to the extension of the second gap. Thus, the creepage distance is formed by virtue of the two bearing surfaces, by means of which any penetrating moisture/liquid is held back. In other words, any labyrinth seal is preferably formed by means of the two bearing surfaces.

Especially preferably, the second bearing surface has multiple subsurfaces, which are separated from each other by means of a crease edge, which thus protrudes at least partly through the second bearing surface. In other words, the crease edge is distant from an edge of the second bearing surface for at least a portion. Because of the crease edge, an angle is formed between the two subsurfaces which are associated with this crease edge. Preferably, the angle is larger than 90° or 110°. Thus, the space requirement is decreased and the assembly process becomes easier. The crease edge is advisedly a straight line, which makes the design process easier.

For example, the first bearing surface likewise has such crease edges. The second bearing surface, however, has at least one more crease edge, and thus one subsurface, more than the first bearing surface. Especially preferably, however, the first bearing surface is flat, and the second bearing surface has precisely the one crease edge, so that the second bearing surface is divided into precisely the two subsurfaces.

Because of the crease edge, on the one hand the size of the area of the second bearing surface is increased as compared to the size of the area of the first bearing surface. Hence, the creepage distance there is likewise increased, so that moisture/liquid is hindered from getting into the region enclosed by the upper housing shell. Moreover, any moisture/liquid getting in is forced to change its direction at the crease edge, so that the drag resistance is further increased. In summary, the working of the labyrinth seal in the region of the second bearing surface is improved as compared to the first bearing surface thanks to the division into the subsurfaces. Hence, any moisture/liquid getting in through the labyrinth seal between the two housing shells is channeled along the first bearing surface, so that the moisture/liquid is kept away from the upper regions of the hearing device in the vertical direction or at least from the region of the hearing device enclosed by means of the upper housing shell thanks to this configuration.

Especially preferably, multiple capillary ducts run between the upper housing shell and the support frame. Each capillary duct locally increases the distance of the upper housing shell from the support frame, so that any moisture/liquid getting in is retained in the capillary ducts. In other words, by virtue of the capillary forces at play, liquid/moisture present in the housing is delivered to and retained in the capillary ducts, i.e., the locally increased distance of the upper housing shell from the support frame. In particular, the distance of the upper housing shell from the support frame in the region where no capillary ducts are present and no other specifications are imposed is between 0.02 mm and 0.08 mm, preferably equal to 0.05 mm. Thus, the design height of the hearing device is comparatively low.

Preferably, the capillary ducts are situated in the region of breaches or openings of the cell housing. In particular, an opening is surrounded by means of at least one of the capillary ducts. In particular, an opening for a switch, for example, such as a toggle switch, or a push button, is surrounded by means of a corresponding capillary duct here. Thus, if moisture gets into the housing there, it will be held in the respective capillary duct or the region bounded by means of the capillary duct, so that a damaging of other components inside the housing is prevented.

For example, one or more such capillary ducts are also present between the lower housing shell and the support frame. Alternatively, this region is clear of such capillary ducts, or in particular they enclose only any openings or breaches in the lower housing shell. Thus, thanks to the absence of capillary ducts, any moisture/liquid present inside the housing will not be prevented from collecting in the lower region of the housing, and it can collect there by virtue of the force of gravity. Thus, an uncontrolled movement of the moisture/liquid is prevented, as well as any interaction with relatively vulnerable components of the hearing device, such as electronics, which are enclosed especially preferably by the upper housing shell.

For example, the capillary ducts are worked into the upper housing shell. Especially preferably, however, the capillary ducts are worked into the support frame, being open toward the upper housing shell. Thanks to the capillary ducts being worked into the support frame, it is possible to make the upper housing shell relatively slender, which reduces the design height and the weight. The mechanical integrity is not affected.

For example, the cross section of the capillary ducts is various among them and/or it is rectangular. Especially preferably, however, the cross section of the capillary ducts is half-round. This makes the fabrication easier. The uptake of moisture/liquid is also improved. In particular, the capillary ducts have a depth between 0.02 mm and 0.08 mm, advisedly equal to 0.05 mm. Thus, on the one hand, the space requirement is not overly increased. On the other hand, the capillary forces act relatively effectively in this way, while nevertheless large manufacturing tolerances can also be chosen.

For example, the capillary ducts have a closed contour and are thus circular in particular, the circles being round for example or having lobes and/or corners. In this configuration, any moisture/liquid getting in will be retained within the region enclosed by means of the respective capillary duct. In such a configuration, a breach/opening of the housing is preferably enclosed by means of the respective capillary duct. Alternatively, for example, one or all of the capillary ducts are situated parallel to the edge. Thus, any moisture/liquid getting in will be captured by means of the capillary duct or ducts, so that the sealing action is further enhanced.

Especially preferably, however, the capillary ducts emerge at the labyrinth seal. In this way, any liquid getting in will be channeled to the labyrinth seal and can diffuse once again to the outside, for example, when the hearing device warms up or when it is no longer used in a humid environment. Thus, it is not necessary to remove any infiltrating moisture/liquid by hand, but instead this will be done during the operation, so that the servicing expense is decreased. For example, both ends of each capillary duct emerge at the labyrinth seal. Alternatively, the remaining end of one, several, or all capillary ducts emerges at a further seal, by means of which a breach/opening of the housing shells is enclosed. Inside this is arranged, in particular, a switch, by means of which the hearing device is operated. Thus, an emergence of the liquid/moisture is also possible there, while no additional components are required. In particular, the seal is made of a rubber and/or it is flexible. Hence, the sealing effect is also not impaired by activating the switch.

Preferably, the energizing of the individual parts/components of the hearing device is done by means of a battery. This is, for example, a secondary battery, so that it is rechargeable. Alternatively, this is not rechargeable, for example, so that manufacturing costs are reduced. Advisedly, the hearing device comprises a battery holder, by means of which the battery is held. In particular, the battery holder has a bracket for this, by means of which the battery is received. The bracket is pot-shaped, for example.

The battery holder is mounted on the support frame, so that movement of the battery holder relative to the support frame also moves the battery. In particular, the housing has a chamber inside which the battery holder and also the battery are arranged in the operating state. In particular, contacts are arranged in the chamber, which then make electrical contact with the battery. Thus, by means of a movement of the battery holder relative to the support frame, the battery is brought out from the chamber of the housing, so that it can be replaced, for example.

The battery holder is advisedly made from the same material as the support frame, which makes the manufacturing easier. For example, the battery holder is mounted lengthwise displaceably on the support frame. Especially preferably, the battery holder is mounted on the support frame able to swivel, so that the battery holder and consequently the battery held by it can be swiveled out from the chamber of the housing relative to the support frame. Advisedly, the chamber is formed by means of the lower housing shell, so that the battery is consequently located in the region enclosed by the lower housing shell. In this way, the center of gravity of the hearing device is relatively low, which makes it easier to use.

Advisedly, the battery holder forms at least partially an outer skin of the hearing device, when the battery is located inside the chamber. In this way, the design is more simple. Advisedly, this region of the battery holder is flush with further components of the housing, especially the lower housing shell, when the battery is located in the chamber. Thus, the collecting of foreign particles here is prevented and the risk of injury is decreased.

Advisedly, a further capillary duct runs between the battery holder and the housing, especially between the battery holder and the lower housing shell. The further capillary duct has a half-round cross section, for example, and/or a depth between 0.02 mm and 0.08 mm. Advantageously, the further capillary duct is worked into the battery holder, so that the mechanical integrity of the housing is not decreased. For example, the battery holder is substantially cylindrical, and the capillary duct is curved and worked into one of the two end faces, in particular. Preferably, one such further capillary duct is worked into each of the end faces and/or it is advisedly set off from a center point of the end face to an edge, so that the distance to the edge is decreased. In particular, the further capillary duct is situated in the outer third of the respective end face.

Because of the further capillary duct, moisture/liquid is prevented from getting in between the housing and the battery holder further into the housing than the further capillary duct, and no additional seals must be kept in stock for this purpose. Thus, the movement of the battery holder relative to the support frame can occur without touching it, so that the effort exerted for this is relatively low. This increases the comfort. There is also less wear and tear in this way.

Other features which are considered as characteristic for the invention are set forth in the appended claims.

Although the invention is illustrated and described herein as embodied in a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts are given the same reference numbers in all of the figures.

Figure 1:
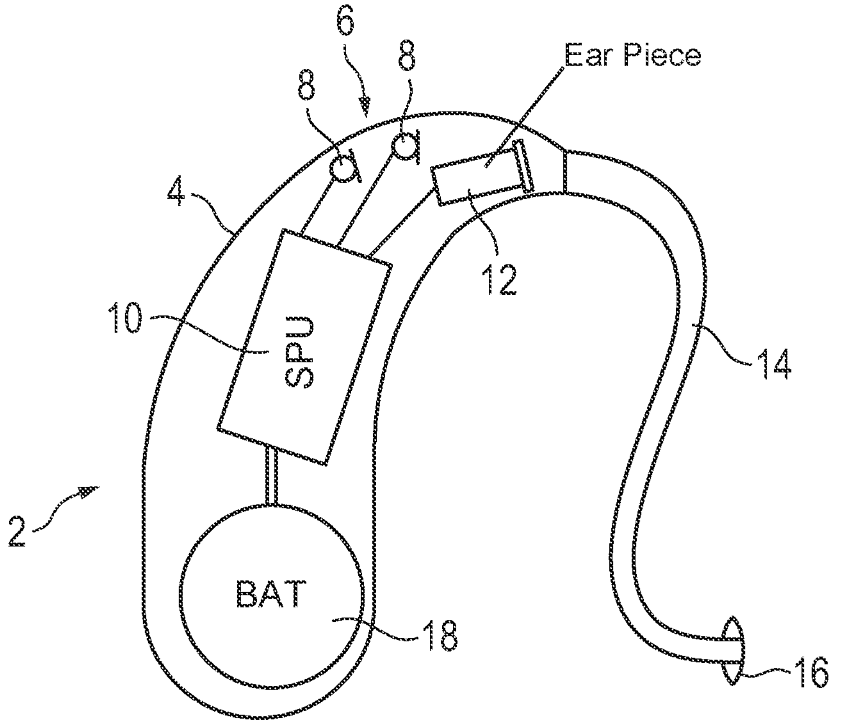
FIG. 1 is an illustration of a hearing device according to the invention.

Referring now to the figures of the drawings in detail and first, particularly to FIG. 1 thereof, there is shown schematically a hearing device 2 in the form of a hearing aid device, which is configured and adapted to be worn behind the ear of the wearer (user, hearing device wearer). In other words, it is a behind-the-ear hearing aid device. The hearing device 2 contains a housing 4, which is made from a plastic. Inside the housing 4 there is situated a microphone 6 having two microphone units 8 the form of an electromechanical sound transducer for each, being omnidirectional in design. By altering a time offset between the acoustic signals detected by means of the omnidirectional microphone units 8, it is possible to change a directional characteristic of the microphone 6, so that a directional microphone is realized.

The two microphone units 8 are coupled to a signal processing unit 10, containing a not otherwise shown amplifier circuit and a signal processor. The signal processing unit 10 is moreover formed by means of circuit elements, such as electrical and/or electronic components. The signal processor is a digital signal processor (DSP) and is connected in terms of signaling via a not otherwise shown A/D-converter to the microphone units 8.

The signal processing unit 10 is coupled in terms of signaling to an earpiece 12. By means of the earpiece 12, which is an electromechanical sound transducer, an (electrical) signal provided by means of the signal processing unit 10 is converted during use into an output sound, i.e., into sound waves. These are taken into an acoustic tube 14, one end of which is fastened to the housing 4. The other end of the acoustic tube 14 is closed by means of a dome 16, which in the normal state of use is arranged in a not otherwise shown auditory canal of the wearer of the hearing device 2. The energizing of the signal processing unit 10 is done by means of a battery 18 arranged in the housing 4. A portion of the electrical energy is taken from the signal processing unit 10 to the microphone 6 and to the earpiece 12.

Figure 2:
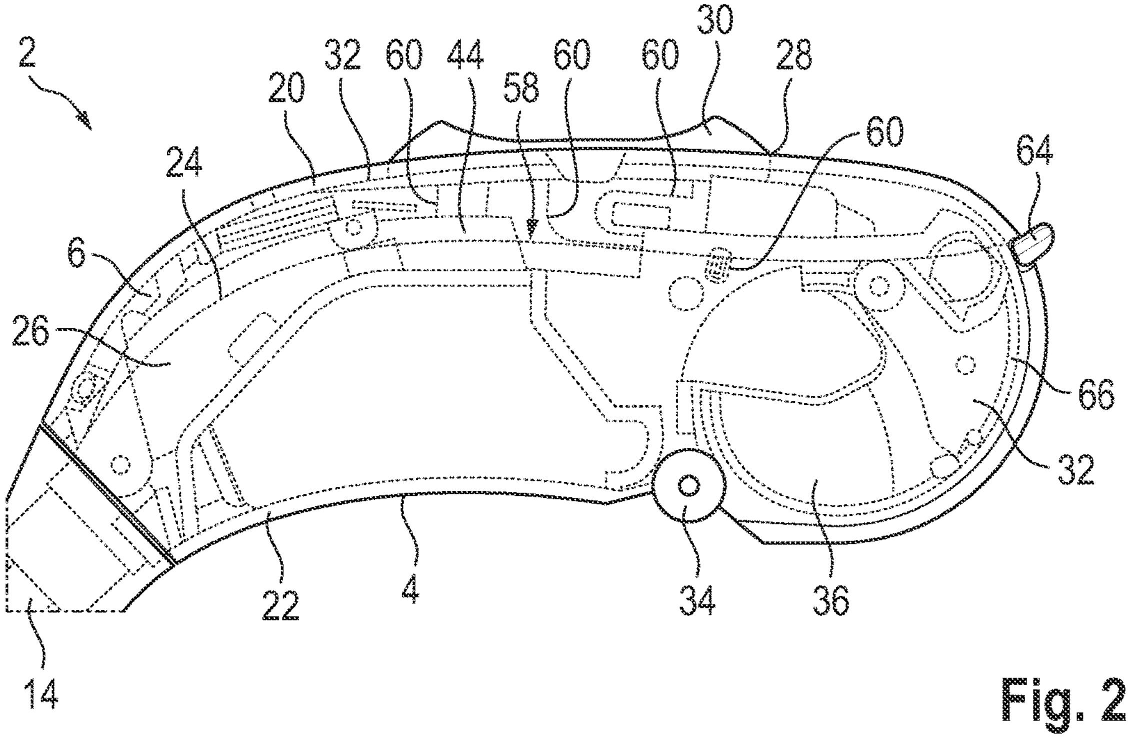
FIGS. 2 and 3 are partly see-through side views of the hearing device containing a support frame and a housing having two housing shells.
Figure 3:
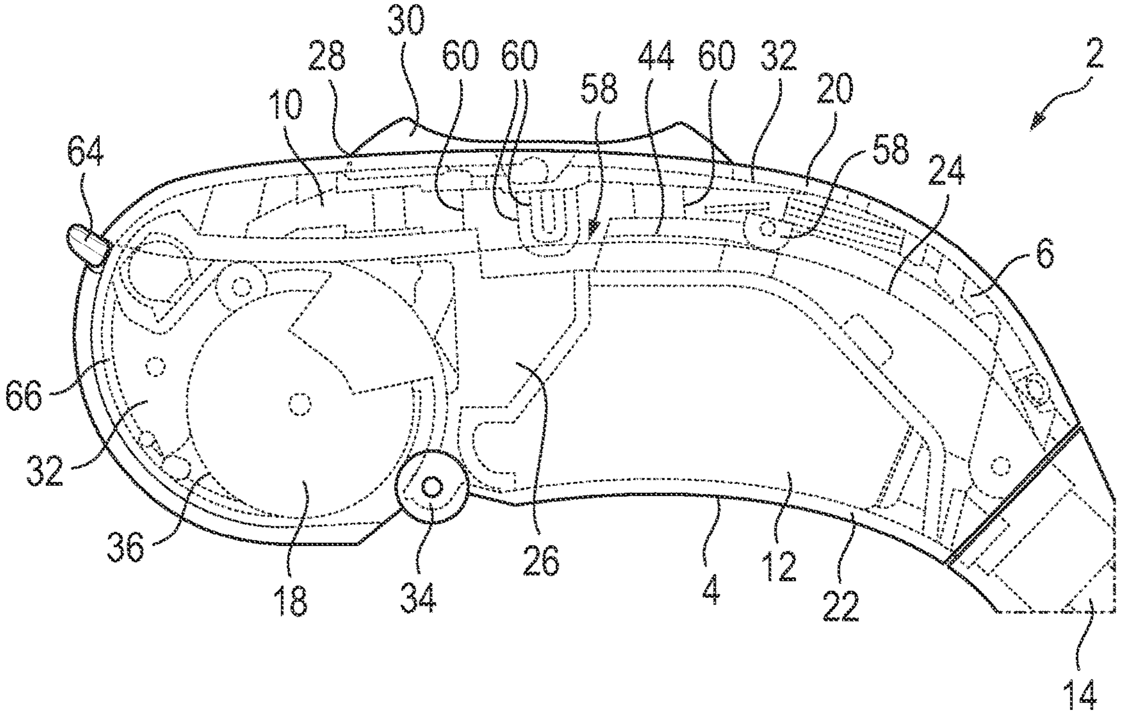

FIGS. 2 and 3 show in various side views the hearing device 2, the housing 4 being shown as transparent. The housing 4 contains an upper housing shell 20 and a lower housing shell 22, which are made from the same material, namely the plastic. The shape of the housing 4 here is dictated by means of the shape of the two housing shells 20, 22, which are joined together at an encircling edge 24. In other words, the two housing shells 20, 22 lie against each other at the edge 24. The edge 24 can be seen here from outside the housing 4. Inside the housing 4 there is arranged a support frame 26, which is made of a plastic. The signal processing unit 10, the earpiece 12 and the microphone 6, as well as any other parts/components, are fastened in captive manner on the support frame 26.

An opening 28 is worked into the upper housing shell 20, which when the hearing device 2 is worn properly forms at least partly the upper (in the vertical direction) and partially lateral closure of the housing 4, inside which opening there is positioned a switch 30. The user can perform an input by means of the switch 30, so that the signal processing unit 10 is reset. Consequently, the switch 30 serves for selecting the operating mode of the hearing device 2. The switch 30 is mounted on the support frame 26 and fastened to it. The switch 30 is designed as a toggle switch and is surrounded by means of a rubber seal 32 inside the housing 4.

Furthermore, a battery holder 32 is swivel mounted on the support frame 26 by means of a hinge 34. The battery holder 32 is substantially cylindrical and has a seat for the battery 18, which in the folded-up state of the battery holder 32 lies inside a chamber 36 which is formed by means of the lower housing shell 22. In this state, a portion of the outer skin of the hearing device 2 is formed by means of the battery holder 32, which in this case is flush with the lower housing shell 22. By swiveling the battery holder 32, it is possible to bring the battery 18 out from the chamber 36 of the housing 4.

Summarizing, by means of the support frame 26 and the components captively secured to it, a module is created which is enclosed by means of the two housing shells 20, 22 forming the housing 4. For the assembly process, the support frame 26 is placed in the lower housing shell 22 and clipped together with it. Then the upper housing shell 20 is placed thereon, so that these lie against each other on the lower housing shell 22, forming the edge 24, and the housing 4 is closed. The switch 30 is then led through the opening 28. The upper housing shell 20 is also clipped together with the support frame 26 and optionally with the lower housing shell 22.

Figure 4:
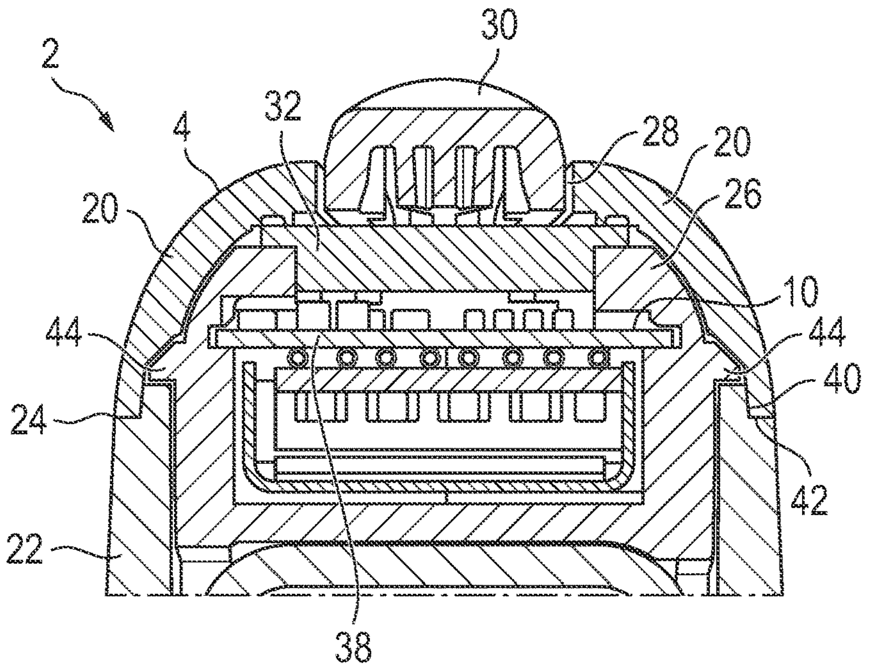
FIG. 4 is a cross section view of a cutout portion of the hearing device.

FIG. 4 shows a portion of the hearing device 2 in a cross sectional view perpendicular to the longitudinal axis of the housing 4. The switch 30 lies in the opening 28, forming a loose fit, so that the switch 30 can be toggled relative to the support frame 26 and thus also to the housing 4. By means of the seal 32 lying against the inside of the upper housing shell 20, any moisture/liquid getting in through the opening 28 will be held back.

The seal 32 is braced against the support frame 26 or fastened there. Beneath the seal 32 is arranged the signal processing unit 10, namely, a circuit board 38 thereof, being mounted with relatively sensitive electrical and/or electronic components. Thus, the seal 32 is located between the circuit board 38 and the switch 30. The circuit board 38 is accommodated here by the support frame 26.

The upper housing shell 20 and the lower housing shell 22 overlap entirely along the edge 24, so that a labyrinth seal 40 is formed. The lower housing shell 22 here has a step 42, along which the upper housing shell 20 lies, so that the cross section of the overlap has an L shape. A protrusion 44 of the support frame 26, which is oriented outward, engages with the labyrinth seal.

Figure 5:
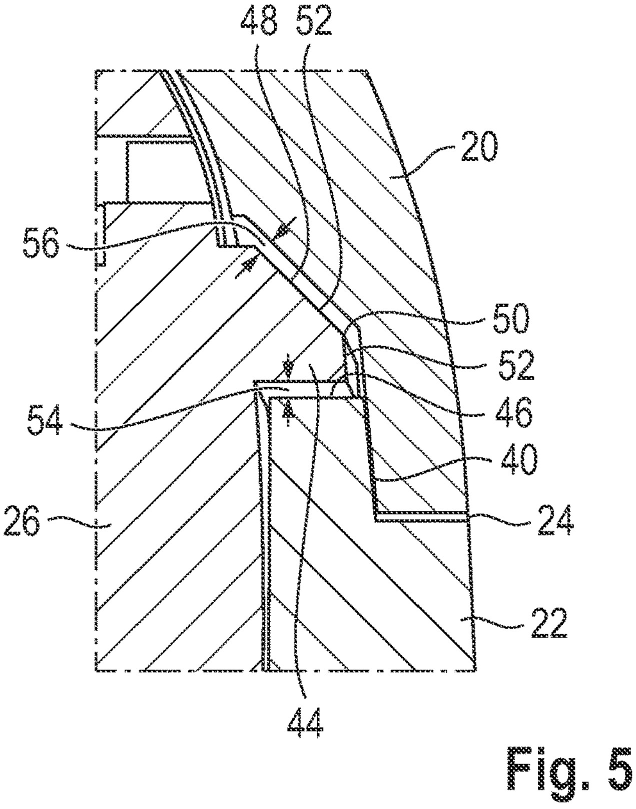
FIG. 5 an enlarged sectional view of the cutout portion of FIG. 4, in which a labyrinth seal is shown between the two housing shells, with which labyrinth seal a protrusion of the support frame engages.

The protrusion 44 is shown enlarged in FIG. 5. A first bearing surface 46 is formed between the lower housing shell 22 and the protrusion 44. The first bearing surface 46 is a straight line in this case. A second bearing surface 48 is formed between the upper housing shell 20 and the protrusion 44. The second bearing surface 48 has a crease edge 50 running parallel to the edge 24, along which crease edge the second bearing surface 48 is divided into two subsurfaces 52, situated at an angle relative to each other and passing into one another at the crease edge 50. The angle here is 135°. Thus, the cross section of the protrusion 44 is in the shape of a right-angled trapezium. Thus, the second bearing surface 48 comprises the crease edge 50, while the first bearing surface 46 is flat in configuration and thus not divided into the subsurfaces 50.

By means of the first bearing surface 46 a first gap 54 is defined, and by means of the second bearing surface 48 a second gap 56. The thickness of the first gap 54 is enlarged in relation to the thickness of the second gap 56. Thus, the first bearing surface 46 has a greater thickness perpendicular to its direction of extension than does the second bearing surface 48.

The protrusion 44 engaging with the labyrinth seal 40 increases the creepage distance for moisture/liquid getting in from the outside across the edge 24. If the moisture/liquid should get as far as the protrusion 44, it will be taken downward by means of the enlarged first gap 54, due to the prevailing force of gravity, and primarily in the vertical direction, i.e., into the lower housing shell 22. Only an entry by virtue of capillary effects will occur in the upper gap 56, i.e., along the second bearing surface 48. But since the crease edge 50 is present, a change of direction is required as it continues to advance, so that the drag resistance is further increased. Moreover, because of the larger area of the second bearing surface 48, the distance to it is increased, so that the penetrating moisture/liquid is held back from penetrating into the upper housing half 20.

The protrusion 44 runs parallel to the edge 24, but it is partly recessed so as to form spaces 58. In this region, the housing shells 20, 22 are thicker, so that the labyrinth seal 40 is also enlarged there.

Figure 6:
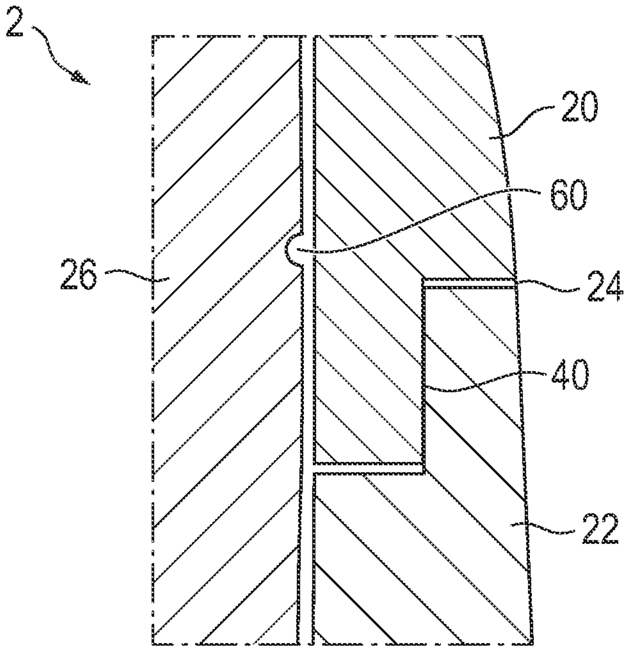
FIG. 6 is further cross-sectional view of the cutout portion of the hearing device.

FIG. 6 shows a cutout of the hearing device 2 in another cross sectional representation perpendicular to the extension of the housing 4. Here as well, the upper housing shell 22 is shown, being placed upon the lower housing shell 22 at the edge 24, forming the labyrinth seal 40. In this cross section, however, one of the spaces 58 is present, so that the protrusion 44 cannot be seen. Multiple capillary ducts 60 are present between the upper housing shell 20 and the support frame 26, one of which is represented in FIG. 6. The capillary duct 60 shown, like the remaining ones, is also worked into the support frame 26, so that a local increasing of the distance of the support frame 26 from the upper housing shell 20 is present in the region of each capillary duct 60. The distance of the support frame 26 from the upper housing shell 20 is basically 0.05 mm in the areas where no capillary ducts 60 are present. The cross section of each capillary duct 60 is half-round, and the depth of each capillary duct 60, i.e., its radius, is 0.05 mm, so that in the region of the capillary ducts 60 the distance of the support frame 26 from the upper housing shell 20 is equal to 0.1 mm.

The capillary ducts 60 run, as shown in FIGS. 2 and 3, between the labyrinth seal 40, i.e., up to the edge 24, and the seal 32, so that the support frame 26 is divided by means of the capillary ducts 60 into different regions in the area of the upper housing shell 20. In other words, the capillary ducts 60 emerge at the labyrinth seal 40. The capillary ducts 60 or a portion of the capillary ducts 60 run perpendicular to the edge 24. Further openings or breaches of the upper housing shell 20, not otherwise shown, are enclosed by means of further capillary ducts 60. These capillary ducts 60 reach partially into the lower housing shell 22.

If moisture/liquid should get in through the labyrinth seal 40, the opening 28 and/or the not otherwise shown further openings/breaches into the housing 4, it will be drawn by the capillary forces into the capillary ducts 60. Hence, the moisture/liquid will be held in the regions separated by means of the respective capillary duct 60, and an uncontrolled spreading of the moisture/liquid will be prevented. Consequently, the moisture/liquid will be kept away from the signal processing unit 10 and other sensitive components of the hearing device 2. It is also possible to take the moisture/liquid away to the outside through the labyrinth seal 40.

Figure 7:
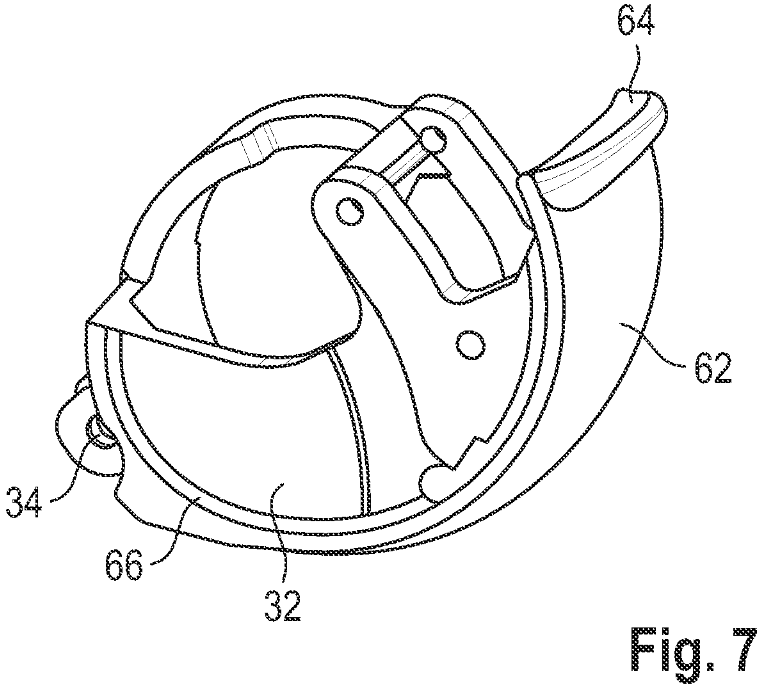
FIG. 7 is a perspective view of a battery holder.

FIG. 7 shows the battery holder 32 in a perspective view, omitting the battery 18. On an outer side 62 of the battery holder 32, which is also visible when the battery 18 is located in the chamber 36, there is formed an outwardly protruding bulge 64, which is the only part not flush with the housing 4 when the battery 18 is arranged in the chamber 36. By means of the bulge 64, it is easier for a person to grasp it such that the battery holder 32 can be swiveled about the hinge 34. The outer side 62 is perpendicular to the two end faces of the cylindrical battery holder 32, in each of which a further capillary duct 66 is produced in the marginal region, i.e., offset toward the outer side 62. In other words, each of the end faces has one of the further capillary ducts 66. The further capillary ducts 66 also have a half-round cross section, the depth being 0.05 m. If moisture/liquid should get into the chamber 36 between the battery holder 32 and the lower housing shell 22, it will be held back by means of the further capillary ducts 66, which run between the battery holder 32 and the housing 4.

The invention is not limited to the exemplary embodiment described above. Instead, other variants of the invention can also be derived by the person skilled in the art, without leaving the subject matter of the invention. In particular, moreover, all individual features described in connection with the exemplary embodiment can also be combined with each other in another manner, without leaving the subject matter of the invention.

The following is a summary list of reference numerals and the corresponding structure used in the above description of the invention.

LIST OF REFERENCE NUMBERS

2 Hearing device
4 Housing
6 Microphone
8 Microphone unit
10 Signal processing unit
12 Earpiece
14 Acoustic tube
16 Dome
18 Battery
20 Upper housing shell
22 Lower housing shell
24 Edge
26 Support frame
28 Opening

30 Switch
32 Battery holder
34 Hinge
36 Chamber
38 Circuit board
40 Labyrinth seal
42 Step
44 Protrusion
46 First bearing surface
48 Second bearing surface
50 Crease edge
52 Subsurface
54 First gap
56 Second gap
58 Space
60 Capillary duct
62 Outer side
64 Bulge
66 Further capillary duct

The invention claimed is:

1. A hearing device, comprising:

a housing having an upper housing shell and a lower housing shell, said upper and lower housing shells are joined together at a circumferential edge and overlap to form a labyrinth seal; and a support frame enclosed by said housing, said support frame having an outwardly directed protrusion engaging with said labyrinth seal, wherein between said outwardly directed protrusion and said lower housing shell there is formed a first gap and between said outwardly directed protrusion and said upper housing shell a second gap, wherein a thickness of said first gap is enlarged in relation to a thickness of said second gap.

2. A hearing device, comprising:

a housing having an upper housing shell and a lower housing shell, said upper and lower housing shells are joined together at a circumferential edge and overlap to form a labyrinth seal; and a support frame enclosed by said housing, said support frame having an outwardly directed protrusion engaging with said labyrinth seal, wherein between said outwardly directed protrusion and said lower housing shell there is formed a first bearing surface and between said outwardly directed protrusion and said upper housing shell a second bearing surface, wherein said second bearing surface is divided into subsurfaces by means of at least one crease edge more than said first bearing surface.

3. The hearing device according to claim 2, wherein between said outwardly directed protrusion and said lower housing shell there is formed a first gap and between said outwardly directed protrusion and said upper housing shell a second gap, wherein a thickness of said first gap is enlarged in relation to a thickness of said second gap.

4. A hearing device, comprising:

a housing having an upper housing shell and a lower housing shell, said upper and lower housing shells are joined together at a circumferential edge and overlap to form a labyrinth seal;

a support frame enclosed by said housing, said support frame having an outwardly directed protrusion engaging with said labyrinth seal; and a plurality of capillary ducts running between said upper housing shell and said support frame.

5. The hearing device according to claim 4, wherein said capillary ducts are worked into said support frame.

6. The hearing device according to claim 4, wherein said capillary ducts have a depth between 0.02 mm and 0.08 mm.

7. The hearing device according to claim 4, wherein said capillary ducts emerge at said labyrinth seal.

8. A hearing device, comprising:

a housing having an upper housing shell and a lower housing shell, said upper and lower housing shells are joined together at a circumferential edge and overlap to form a labyrinth seal, wherein said housing further has a chamber;

a support frame enclosed by said housing, said support frame having an outwardly directed protrusion engaging with said labyrinth seal;

a battery;

a battery holder mounted on said support frame such that said battery being held in said battery holder being brought out from said chamber of said housing; and a further capillary duct running between said battery holder and said housing.

9. The hearing device according to claim 1, wherein the hearing device is a hearing aid device.

* * * * *